Figure 1:
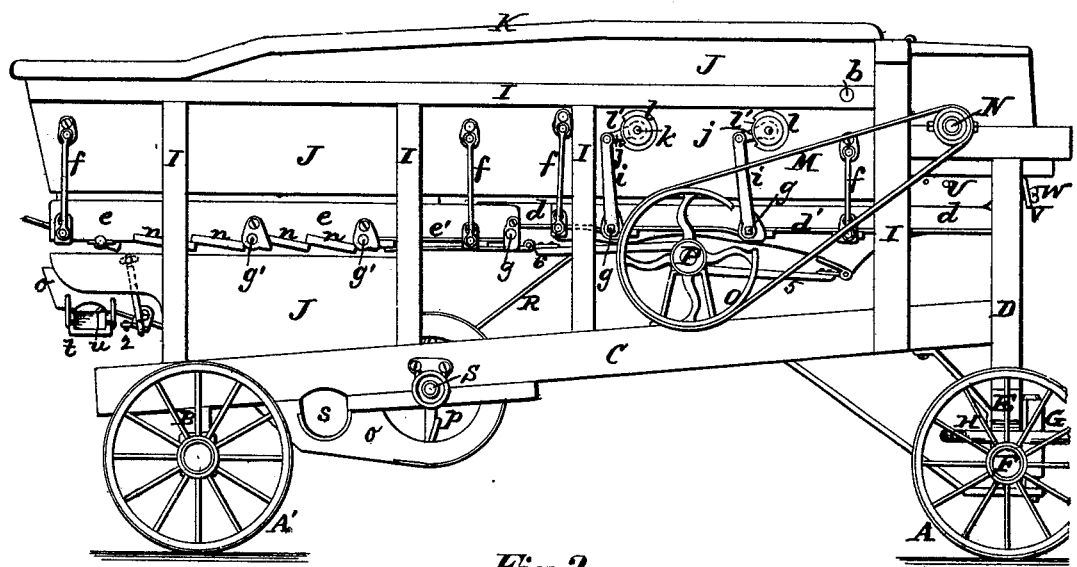

3 Sheets—Sheet 1.

J. A. THROP.
THRASHING-MACHINE.

No. 176,382. Patented April 18, 1876.

ATTEST:
Robert Burns.
H. T. Tanner.

INVENTOR:
John A. Throp
By Knight Bros
Attys.

3 Sheets—Sheet 2.

J. A. THROP.
THRASHING-MACHINE.

No. 176,382. Patented April 18, 1876.

ATTEST:
Robert Burns.
H. G. Tanner.

INVENTOR:
John A. Throp.
By Knight Bros.
Attys.

3 Sheets—Sheet 3.

J. A. THROP.
THRASHING-MACHINE.

No. 176,382. Patented April 18, 1876.

ATTEST: Robert Burns. H. G. Tanner.

INVENTOR: John A. Throp. By Knight & Bro. Attys.

UNITED STATES PATENT OFFICE.

JOHN A. THROP, OF THREE RIVERS, MICHIGAN.

IMPROVEMENT IN THRASHING-MACHINES.

Specification forming part of Letters Patent No. 176,382, dated April 18, 1876; application filed April 6, 1874.

*To all whom it may concern:*

Be it known that I, JOHN A. THROP, of Three Rivers, in the county of St. Joseph and State of Michigan, have invented certain new and useful Improvements in Thrashing-Machines, of which the following is a specification:

The first part of my improvement consists in providing improved means for making the "concave" beneath the cylinder adjustable by supporting it at the inner edge upon pivots, and placing at its outer edge a means of adjustment, so as to regulate its distance from the cylinder.

The second part of my improvement consists in the provision at the rear of the cylinder of what I denominate a beater, which consists of two or more radial wings on a rotating shaft. The wings receive the impact of the flying grain, and beat it through a perforated concave into a solid-bottom pan, which extends forward under the concave. The beater thus prevents the grain from being thrown to a distance in the machine which would endanger its being carried out by the straw. The wings also, by their action on the straw, insure its continuous motion through the machine, and prevent its lodging and winding around the cylinder when it is damp.

The third part of my improvement relates to the construction and attachment of the arms by which the oscillation of the straw-rakes in the reciprocating pans is effected. These my improved arms are at their lower ends, like those heretofore in use, attached firmly to the rake-shafts; but, unlike those heretofore used, the upper end of each arm is connected, by a link or pivoted connecting-bar, to a fixed pivot, so that the upper end of the arm is restrained from longitudinal movement—that is, movement in the direction of the length of the machine—but has free vertical movement, and the bottom end of the arm has free movement with the pan in which the rock-shaft has its bearings.

The fourth part of my improvement consists in the provision of a deflecting-plate above the tailings-chute, to deflect the air-blast into said chute or trough to keep it clear of chaff, &c.

The fifth part of my improvement relates to a device by which the elevation of the rake-teeth of those rakes at the tail end is made adjustable. This consists in attaching to the top of the arm by which oscillation is given to the rock-shaft flexible tongues, which are coiled upon spools adjustable on fixed pivots, one of the said spools being placed on each side of an arm, so that by turning the spools so as to wind up the tongue on one side and let it out on the other, the end of the arm may be drawn over to the right or the left, and the free ends of the rake-teeth consequently lowered or raised, so as to accelerate or check the movement of the straw over the riddles.

Figure 2:
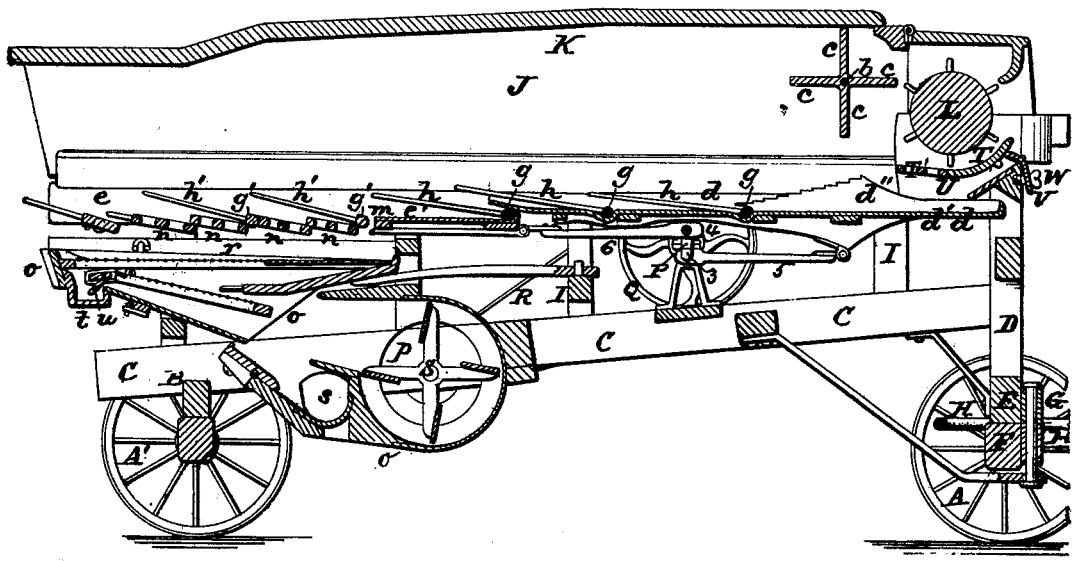
Figure 3:
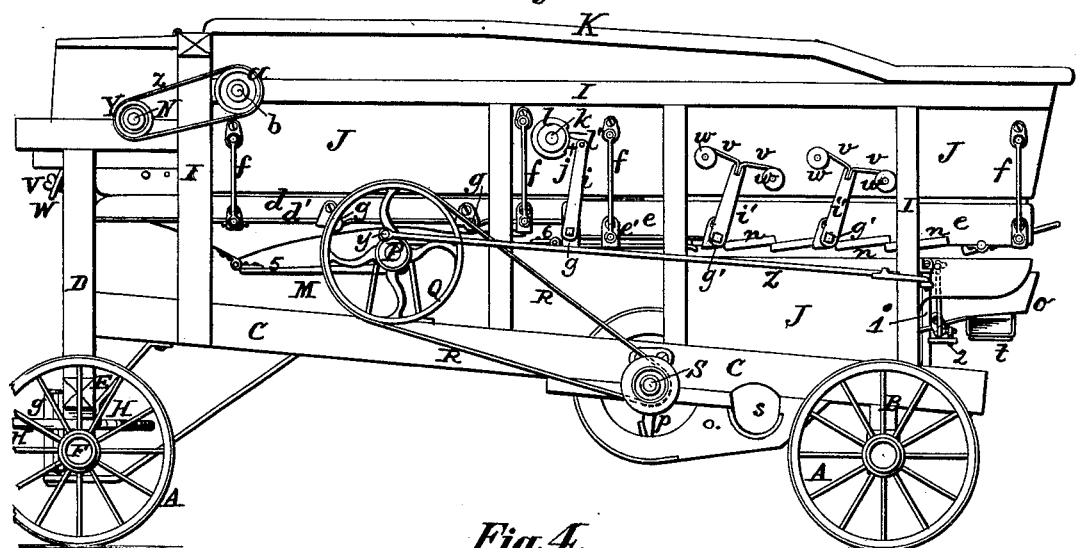
Figure 4:
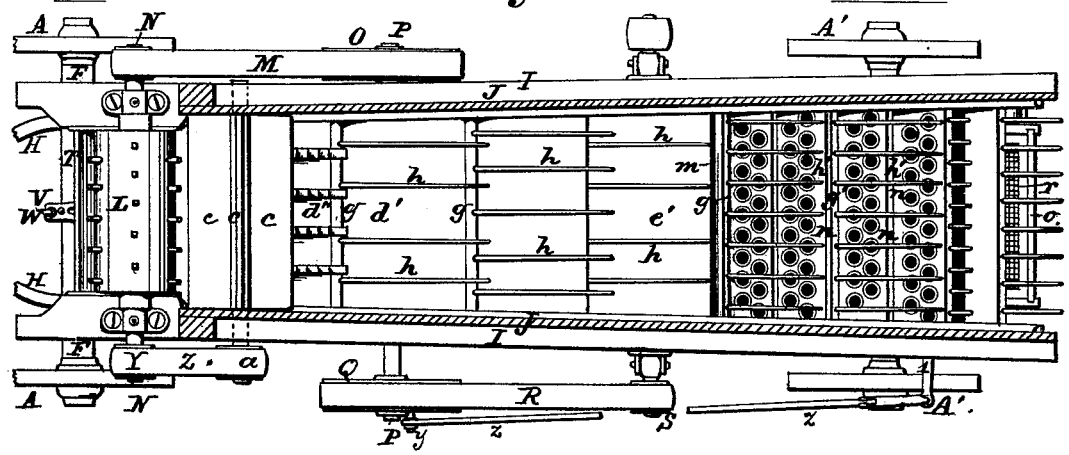
Figure 5:
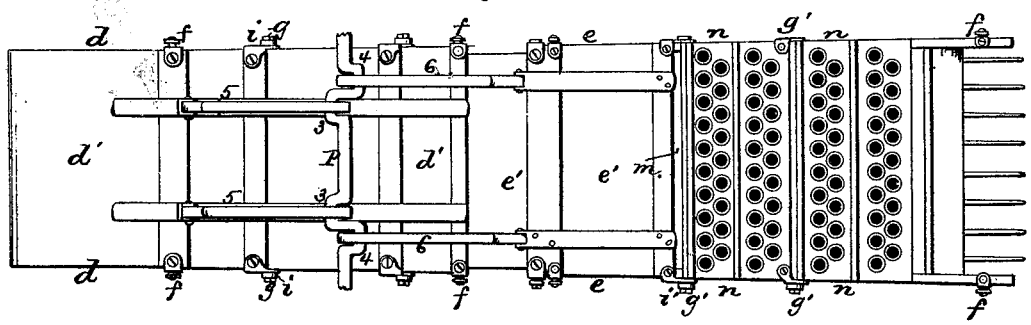
Figure 6:
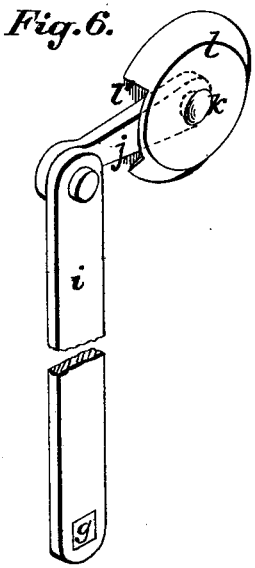

Figures 1 and 3 are elevations of opposite sides. Fig. 2 is a longitudinal section. Fig. 4 is a top view of the working parts, the top of the machine being removed. Fig. 5 is a bottom view of the reciprocating pans with their actuating-shaft and pitmen. Fig. 6 shows, in perspective, the tops of rock-shaft rake-arms.

A A' are, respectively, the fore and hind wheels of the machine. The longitudinal sills C rest directly on the hind bolster B, but these sills incline upward forwardly, and are framed at the fore end into the uprights D D, whose lower ends are mortised into a bolster, E, resting upon the front axle F, and connected therewith by a king-bolt, G. Upon the bottom of the bolster is a bearing-ring, H, strongly attached to the bolster, for the support of the ends of the bolster E, when the axle F is turned obliquely to the bolster, so as to prevent the tilting of the machine when being hauled from place to place, or when in use. The elevation of the forward ends of the sills C, admits of the fore wheels passing under them. The machine has a frame, I, close sides J, and top K. L is the thrashing-cylinder rotated by a belt, M, on the pulley N, and which extends around a pulley, O, on a shaft, P, the said shaft also carrying a pulley, Q, driven by a belt, R, from the pulley on the driving-shaft S. The concave T beneath the cylinder L is supported at the inner side upon pivots U, and its outer side rests upon the forked bar or lever V, which has a fulcrum bearing on the cross-bar, and is adjusted by a set-screw, W, so as to adjust the outer edge of the concave to regulate its distance from the cylinder L. T' represents a plate forming an extension of the concave rearwardly. Y is a pulley on the cylinder-shaft carrying a belt, Z, extending around a pulley, $a$, on the shaft $b$ of the beater. On the shaft $b$ are two or more radial wings, $c$, constituting what I denominate a beater. These wings are to receive the impingement of the flying grain thrown by the teeth of the cylinder L.

In thrashing-machines, as heretofore constructed, where the beater is not employed, the grain is much of it thrown forward by the swiftly-rotating cylinder, and said grain, falling down upon the straw at a distance from the cylinder, is, some of it, carried out and lost.

Another useful purpose fulfilled by the beater is that it insures the continuous forward movement of the straw, and in this connection it is chiefly useful in damp grain, which is apt, without this appendage, to lodge in the part of the machine contiguous to the cylinder, and to lap around the cylinder. This beater is placed in close proximity to the cylinder, as shown, and in this position it is adapted to prevent the grain being thrown over the end of the conveyer. It will be observed that the beater receives the impact of the grain thrown from the cylinder, and prevents it flying out of the machine, while the perforated concave T', extending rearward toward the beater, allows the deflected grain to fall through it onto the solid-bottom conveyer which extends forward under the concave a sufficient distance to prevent the loss of any of the grain.

$d$ is the forward reciprocating pan or separator, and $e$ the rear reciprocating pan. These pans are suspended on pivoted links $f$, and have endwise reciprocation. The pan $d$ extends to the forward end of the machine under the concave, so as to catch the grain as it is driven through the perforated portion T' of said concave, and has a tight bottom, $d'$, its whole length. At its forward end (the end nearest to the cylinder L) are a number of longitudinal ratchet-bars, $d''$, fixed to the pan bottom, the steps or ratcheted surfaces descending backward from the cylinder. The pans $d$ and $e$ each of them broaden toward the rear so as to allow the body of straw to expand laterally as it passes backward, and to lessen the friction of the straw against the sides of the pans. Without this provision to allow the expansion of the stream of straw, the straw is liable to be piled up somewhat thicker at the edges of the pans, but their backwardly-expanding form removes this tendency.

$g$ are transverse rock-shafts, having bearings in the pans, and carrying rake-teeth $h$, which are raised as the pans are moved forward, and descend as the pans move backward, in their reciprocations, so as to shake the straw and cause it to move onward to the tail end of the machine—this movement of the straw being encouraged because the teeth have more frictional hold on the straw when rising than when falling. These rakes are oscillated by the following means: To each rock-shaft is attached an arm, $i$, whose upper end is connected by a link, $j$, to a pin, $k$, fixed in the side of the machine. The link $j$ is held on the pin $k$ by a cap, $l$, slotted at one side at $l'$ to allow the passage of the link. (See Fig. 6.) Heretofore these arms $i$ have passed through staples to cause the oscillation of the rakes by the reciprocation of the pans, (the staples, like the pins $k$, being fixed to the sides of the machine,) but this device results in much friction and wear and jarring; whereas, with the link-joint $j$ $k$ these objectionable features are avoided.

The forward end of the pan $e$ has a close bottom, $e'$, like the pan $d$, and carries a similar rake, $g$ $h$. At the rear end of this close portion or bottom is a slot, $m$, extending across from side to side of the pan, and back of the slot $m$ the bottom of the pan is composed of a number of perforated plates or riddles, $n$, so inclined as to check the escape of grain over their rear edge. The grain, falling through the slot $m$ and the riddles $n$, drops onto the riddles of the shoe O. This shoe has the usual rotary fan $p$ and the riddles $r$ made changeable, as is necessary for the different varieties of grain and seed. $s$ is a discharge-chute for the grain. At the outer end of the shoe is a transverse trough, $t$, inclined so as to convey the tailings to one side of the machine. The chaff, &c., has been found liable to collect in this trough. To overcome this difficulty I place over the said trough a deflector, $u$, extending from side to side of the shoe, and so inclined as to deflect the blast downward into the trough, and thus to keep it clear. Above the riddles $n$ are the rakes $g'$ $h'$, which have the same oscillatory motion as those $g$ $h$, but which also have a means for adjusting the elevation of the teeth $h'$. This is done in a manner now to be described.

From the upper end of each of the arms $i'$ extend two flexible tongues, $v$ $v$, (say, of leather.) These tongues are coiled around spools $w$ $w$ upon each side. The spools may turn with sufficient friction to prevent the uncoiling of the tongues by the strain of the arm $i'$; or they may be prevented from backward rotation by a ratchet and pawl or other means. To adjust the inclination of the rake-teeth $h'$ the tongue is uncoiled the proper amount from the spool $w$ upon one side, and the other tongue coiled up to as great an extent upon the other side, resulting in drawing over the arm $i'$ to the right or the left. The shoe has oscillation from a crank, $y$, on the shaft P, a pitman, $z$, and bell-crank 1, and a link, 2.

The pans $d$ and $e$ receive their reciprocating motion from the shaft P by the following means: Upon the shaft P are cranks 3 3 and 4 4, projecting in opposite directions. (See Fig. 5.) The cranks 3 3 are connected to the pan $d$ by pitmen 5 5, and the cranks 4 4 are connected to the pan $e$ by pitmen 6 6. As these cranks 3 3 and 4 4 project from the shaft in the opposite directions it is evident that the two pans will at all times move in opposite directions, the one from the other, and being of equal weight, and requiring equal power to move them, their resistance will be equally balanced on the shaft.

I claim herein as new and of my invention—

1. The concave T, pivoted at its inner ends by pivots U and the extension-plate T', in combination with the adjustable Y-bar V, slotted at its lower end to receive a set-screw, W, and adapted to adjust the concave T by the pressure of the set-screw on the lower end of said bar, or lower said concave by withdrawing said set-screw, as set forth.

2. The combination, with the cylinder L and beater b c contiguous thereto, of the perforated concave T T' and reciprocating pan d, having solid bottom d' extending forward under the concave T, the whole arranged and operating as and for the purpose set forth.

3. In combination with the pan d the arms i, links j, pins k, and slotted holding-caps l l', to limit the movement of the pan, as set forth.

4. The combination, with the inclined trough t, at the rear of the shoe, of the fixed deflecting-plate u, adapted to direct the blast downward into said trough, to assist the removal of the chaff, as set forth.

5. The combination of the pan e, rock-shaft g', arm i', tongues v v, and reels w w, substantially as set forth.

JOHN A. THROP.

Witnesses:
JAS. H. LYON,
CHAS. A. LYON.